US011748851B2

(12) United States Patent
Ye et al.

(10) Patent No.: US 11,748,851 B2
(45) Date of Patent: Sep. 5, 2023

(54) METHOD OF REPLACING MISSING IMAGE DATA BY USING NEURAL NETWORK AND APPARATUS THEREOF

(71) Applicant: Korea Advanced Institute of Science and Technology, Daejeon (KR)

(72) Inventors: JongChul Ye, Daejeon (KR); Dongwook Lee, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 160 days.

(21) Appl. No.: 16/706,224

(22) Filed: Dec. 6, 2019

(65) Prior Publication Data
US 2020/0311874 A1    Oct. 1, 2020

(30) Foreign Application Priority Data

Mar. 25, 2019  (KR) .................. 10-2019-0033826
Oct. 11, 2019  (KR) .................. 10-2019-0125886

(51) Int. Cl.
*G06T 5/00*  (2006.01)
*G06N 20/20*  (2019.01)
(Continued)

(52) U.S. Cl.
CPC ............ *G06T 5/001* (2013.01); *G06N 3/045* (2023.01); *G06N 3/08* (2013.01); *G06N 20/20* (2019.01);
(Continued)

(58) Field of Classification Search
CPC . G06T 5/001; G06T 5/50; G06T 2207/20081; G06T 2207/20084;
(Continued)

(56) References Cited

U.S. PATENT DOCUMENTS 10,825,219 B2 * 11/2020 Fu .................... G06V 40/16
11,551,652 B1 *  1/2023 Pajjuri ................ G06N 3/045
(Continued)

FOREIGN PATENT DOCUMENTS

KR    1020190024636    3/2020

OTHER PUBLICATIONS

Choi et al., "StarGAN: Unified Generative Adversarial Networks for Multi-Domain Image-to-Image Translation", Sep. 21, 2018, pp. 1-15.
(Continued)

*Primary Examiner* — Nancy Bitar
(74) *Attorney, Agent, or Firm* — Blank Rome LLP

(57) ABSTRACT

Disclosed are a method and apparatus for replacing missing image data. The method of replacing missing image data includes receiving input image data for at least two or more domains among preset multiple domains, and restoring missing image data of a preset target domain by using a neural network that uses the two or more input image data as inputs. The neural network may combine fake image data of a first target domain generated by inputting real image data of at least two or more domains of the multiple domains and the real image data, and be trained by using a multi-cycle consistency loss in which an image restored by inputting the combined image data is similar with the real image data.

10 Claims, 5 Drawing Sheets

(a) Cross-domain models  (b) StarGAN (c) Cllaborative GAN

(51) Int. Cl.
    *G06N 3/08*     (2023.01)
    *G06T 5/50*     (2006.01)
    *G06N 3/045*     (2023.01)

(52) U.S. Cl.
    CPC ...... *G06T 5/50* (2013.01); *G06T 2207/20081* (2013.01); *G06T 2207/20084* (2013.01); *G06T 2207/20212* (2013.01)

(58) Field of Classification Search
    CPC .......... G06T 2207/20212; G06T 2207/10152; G06T 2207/30196; G06T 2207/10088; G06T 2207/10004; G06T 11/00; G06T 5/005; G06N 20/20; G06N 3/0454; G06N 3/08
    See application file for complete search history.

(56) References Cited

U.S. PATENT DOCUMENTS

| | | | |
|---|---|---|---|
| 11,580,869 B2 * | 2/2023 | Smith | G06N 7/023 |
| 11,610,599 B2 * | 3/2023 | Grauman | G06N 3/063 |
| 2017/0032222 A1 * | 2/2017 | Sharma | G06V 10/449 |
| 2018/0247201 A1 | 8/2018 | Liu et al. | |
| 2019/0042883 A1 * | 2/2019 | Park | G06V 10/764 |
| 2019/0066281 A1 * | 2/2019 | Zheng | G06T 7/174 |
| 2019/0295302 A1 * | 9/2019 | Fu | G06V 10/82 |
| 2020/0073968 A1 * | 3/2020 | Zhang | G06F 16/137 |
| 2020/0184660 A1 * | 6/2020 | Shi | G06T 7/30 |

OTHER PUBLICATIONS

Lee et al. "Collaborative GAN for Missing Image Data Imputation", Computer Science > Computer Vision and Pattern Recognition, Mar. 25, 2019, pp. 1-16.

* cited by examiner

METHOD OF REPLACING MISSING IMAGE DATA BY USING NEURAL NETWORK AND APPARATUS THEREOF

CROSS-REFERENCE TO RELATED APPLICATIONS

A claim for priority under 35 U.S.C. § 119 is made to Korean Patent Application No. 10-2019-0125886 filed on Oct. 11, 2019, and Korean Patent Application No. 10-2019-0033826 filed on Mar. 25, 2019, in the Korean Intellectual Property Office, the entire contents of which are hereby incorporated by reference.

BACKGROUND

Embodiments of the inventive concept described herein relate to a technique for replacing missing image data using a neural network, and more particularly, relate to a method and apparatus for replacing missing image data capable of reconstructing missing image data of a target domain by using a neural network which uses image data of each of multiple domains as an input.

In many image processing and computer vision applications, multiple input image sets are required to produce a desired output. For example, brain magnetic resonance imaging (MRI) requires all MR images with T1, T2, and fluid-attenuated inversion recovery (FLIR) contrast for accurate diagnosis and segmentation of cancer margin. When generating a 3D volume from a multi-view camera image, most algorithms require a previously specified set of view angles. However, a complete set of input data is often difficult to obtain due to acquisition costs and time, systematic errors in the data set, and the like. For example, in the generation of a synthetic MR contrast using a magnetic resonance image compilation sequence, there are many system errors in the synthetic T2-FLAIR contrast image, thereby leading to misdiagnosis. In addition, missing data may cause significant biases, thereby making errors in data processing and analysis and reducing statistical efficiency.

Rather than acquiring all data sets again in an unexpected situation that is often not feasible in a clinical environment, missing data may be replaced by substituted values, and this process is called an imputation. When all missing values are replaced, the data set may be used as an input to the standard technique designed for the complete data set.

There are several standard methods for replacing missing data based on a modeling assumption for the entire set, such as mean imputation, regression imputation, statistical imputation, and the like. However, such a standard algorithm has a limitation for high dimensional data such as an image because image imputation requires knowledge of a high dimensional data manifold.

There is a similar technical problem in the image-to-image transition problem, and the goal of this problem is to change a certain aspect of a given image to another image. Tasks such as super resolution, denoising, deblurring, style transfer, semantic segmentation, and depth prediction may correspond to image-mapping of an image in one domain to a corresponding image in another domain. In this case, each domain has different aspects such as resolution, facial expression, light angle, and the like, and it is necessary to know the intrinsic manifold structure of an image data set to be converted between domains. In recent years, these tasks have been greatly improved by the generative adversarial network (GAN).

The general GAN framework consists of two neural networks of a generator (G) and a discriminator (D). When a discriminator finds a feature to distinguish a fake sample from a real sample through training, the generator learns a scheme of removing and synthesizing the feature that the discriminator uses to identify the fake sample from the real sample. Thus, GANs may produce more realistic samples where the discriminator cannot distinguish between real and fake. The GANs have shown remarkable success in a variety of computer vision tasks such as image generation, image conversion, and the like.

Unlike the existing GANs, a conditional GAN (Co-GAN) controls the output by adding an information label as a parameter of an additional generator. In this case, the generator learns a method of producing a fake sample having a specific condition or characteristics (a label associated with an image or a more detailed tag) instead of generating a generic sample from an unknown noise distribution. A successful application of a conditional GAN is for inter-image conversion such as pix2pix for paired data and CycleGAN for unpaired data.

CycleGAN (J.-Y. Zhu, T. Park, P. Isola, and A A Efros. Unpaired imageto-image translation using cycle-consistent adversarial networks. arXiv preprint, 2017.) and DiscoGAN (T. Kim, M. Cha, H. Kim, J. K. Lee, and J. Kim. Learning to discover cross-domain relations with generative adversarial networks. arXiv preprint arXiv:1703.05192, 2017.) try to preserve the key attributes between the input and output images by using cycle consistency losses. However, such a framework may only learn the relationship between two different domains at once. This approach is limited in scalability when processing multiple domains because each domain pair requires a separate domain pair and a total of N×(N−1) generators to process N distinct domains as shown in FIG. 1A. In order to generalize multi-domain translation idea, a technique according to a conventional embodiment has proposed a so-called StarGAN capable of learning translation mapping between a plurality of domains as a single generator as shown in FIG. 1B, and in recent years, a similar multi-domain transport network has been proposed.

StarGAN (Y. Choi, M. Choi, M. Kim, J.-W. Ha, S. Kim, and J. Choo. StarGAN: Unified generative adversarial networks for multidomain image-to-image translation. arXiv preprint, 1711, 2017.) and Radial GAN (J. Yoon, J. Jordon, and M. van der Schaar. RadialGAN: Leveraging multiple datasets to improve target-specific predictive models using generative adversarial networks. arXiv preprint arXiv: 1802.06403, 2018.) are recent frameworks that process multiple domains by using a single generator. For example, in StarGAN, in-depth connection from a mask vector representing an input image and a target domain helps to map the input to a reconstructed image in the target domain. In this case, a discriminator should be designed to perform another function for domain classification. In detail, the discriminator determines the class of a sample as well as the authenticity of the sample.

Such GAN-based image transmission technology is closely related to image data replacement because image transition may be regarded as a process that is capable of modeling an image manifold structure to estimate a missing image database. However, there is a fundamental difference between image imputation and translation. For example, the cycleGAN and starGAN are interested in translating one image into another image without considering the remaining domain data set as shown in FIGS. 1A and 1B. However, in the image replacement problem, missing data is not frequently generated, and the goal is to estimate the missing data by using another clean data set.

SUMMARY

Embodiments of the inventive concept provide a method and an apparatus for replacing missing image data that can improve reconstruction performance by reconstructing missing image data of a target domain by using a neural network that uses image data of each of multiple domains as an input.

According to an exemplary embodiment, a method of replacing missing image data includes receiving input image data for at least two or more domains among preset multiple domains, and restoring missing image data of a preset target domain by using a neural network that uses the two or more input image data as inputs.

The neural network may combine fake image data of a first target domain generated by inputting real image data of at least two or more domains of the multiple domains and the real image data, and be trained by using a multi-cycle consistency loss in which an image restored by inputting the combined image data is similar with the real image data.

The receiving of the input image data may include receiving the input image data for the at least two or more domains together with information about the target domain.

The neural network may include at least one of a generative adversarial networks (GAN), a convolutional neural network, a convolution framelet based neural network, and a multi-resolution neural network including a pooling layer and an unpooling layer.

The neural network may include a bypass connection from the pooling layer to the unpooling layer.

In addition, according to an exemplary embodiment, a method of replacing missing image data includes receiving input image data for at least two or more domains among preset multiple domains and information about a target domain, and restoring missing image data of the target domain by using a neural network that uses the two or more input image data and the information about the target domain as inputs.

The neural network may combine fake image data of a first target domain generated by inputting real image data of at least two or more domains of the multiple domains and the real image data, and be trained by using a multi-cycle consistency loss in which an image restored by inputting the combined image data is similar with the real image data.

In addition, according to an exemplary embodiment, an apparatus for replacing missing image data includes a receiver that receives input image data for at least two or more domains among preset multiple domains, and a restoring unit that restores missing image data of a preset target domain by using a neural network that uses the two or more input image data as inputs.

The apparatus neural network may combine fake image data of a first target domain generated by inputting real image data of at least two or more domains of the multiple domains and the real image data, and be trained by using a multi-cycle consistency loss in which an image restored by inputting the combined image data is similar with the real image data.

The receiver may receive the input image data for the at least two or more domains together with information about the target domain.

The neural network may include at least one of a generative adversarial networks (GAN), a convolutional neural network, a convolution framelet based neural network, and a multi-resolution neural network including a pooling layer and an unpooling layer.

The neural network may include a bypass connection from the pooling layer to the unpooling layer.

In addition, according to an exemplary embodiment, a method of replacing missing image data includes receiving input image data for at least two or more domains among preset multiple domains, and restoring missing image data of a preset target domain corresponding to the two or more input image data by using a neural network learned by a predefined multi-cycle consistency loss.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
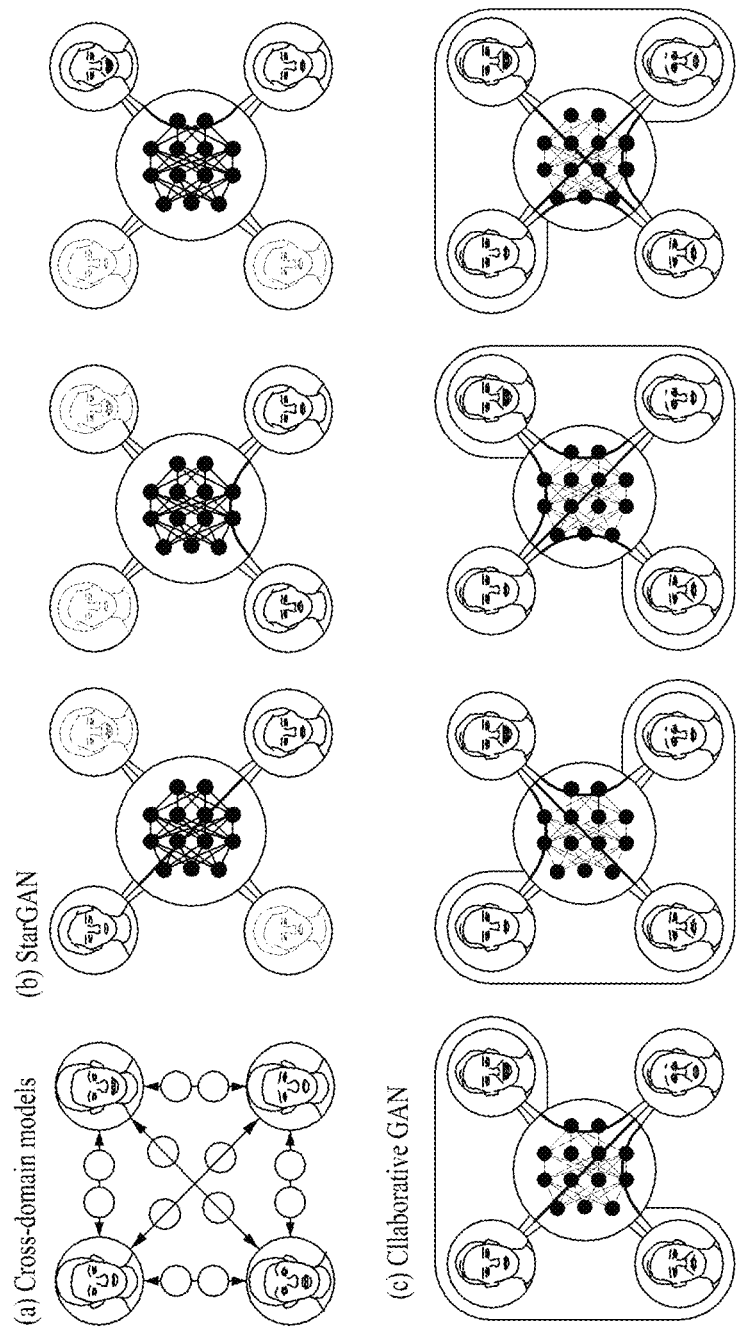
FIG. 1 is a view illustrating an example of an image transformation task according to the related art and the inventive concept.

Advantages and features of embodiments of the inventive concept, and method for achieving them will be apparent with reference to the accompanying drawings and detailed description that follows. But, it should be understood that the inventive concept is not limited to the following embodiments and may be embodied in different ways, and that the embodiments are given to provide complete disclosure of the inventive concept and to provide thorough understanding of the inventive concept to those skilled in the art, and the scope of the inventive concept is limited only by the accompanying claims and equivalents thereof.

The terms used in the present disclosure are provided to describe embodiments, not intended to limit the inventive concept. In the present disclosure, singular forms are intended to include plural forms unless the context clearly indicates otherwise. It will be further understood that the terms "comprises," and/or "comprising," used herein, specify the presence of stated elements, steps and/or components, but do not preclude the presence or addition of one or more other elements.

Unless otherwise defined, all terms used herein (including technical or scientific terms) have the same meanings as those generally understood by those skilled in the art to which the inventive concept pertains. Such terms as those defined in a generally used dictionary are not to be interpreted as having ideal or excessively formal meanings unless defined clearly and specifically.

Hereinafter, exemplary embodiments of the present disclosure will be described in detail with reference to the accompanying drawings. The same reference numerals are used for the same components in the drawings, and duplicate descriptions of the same components are omitted.

Embodiments of the inventive concept are to restore the missing image data of a target domain by using a neural network that uses image data of each of multiple domains as an input.

In this case, the inventive concept may combine fake image data of a target domain generated from input image data of multiple domains and the input image data, and train a neural network by using multiple cycle consistency loss, in which the image reconstructed from the combined multi-domain image data must be similar to the original input image data, to generate a learning model, and restore missing image data of the target domain by using the neural network of the generated learning model.

The neural network according to the inventive concept may include various kinds of neural networks such as a generative antagonist network (GAN), a convolutional neural network, a convolutional framelet-based neural network, a multi-resolution neural network, for example, U-Net, including a pooling layer and an un-pooling layer as well as all kinds of neural networks usable in the inventive concept. In this case, the multi-resolution neural network may include a bypass connection from the pooling layer to the un-pooling layer.

The inventive concept describes a collaborative generative adversarial network (CollaGAN) framework that processes multiple inputs to produce more realistic and feasible outputs. The CollaGAN framework according to the inventive concept processes multiple inputs from multiple domains, as compared with Star-GAN which processes a single input and a single output, as shown in FIG. 1C. The image replacement technique according to the inventive concept provides a number of advantages over existing methods.

First, a basic image manifold may obtain synergistic effects from multiple input data sets that share the same manifold structure rather than a single input. Thus, estimates of missing values using CollaGAN are more accurate.

Second, CollaGAN still maintains a first-generation architecture similar to StarGAN with high memory efficiency compared to CycleGAN.

The inventive concept will be described in detail as follows.

Image Replacement (Imputation) Using Multiple Inputs

For convenience of explanation, it is assumed that there are four types of domains (N=4) of a, b, c and d. In order to process multiple inputs using a single generator, the inventive concept trains the generator through collaborative mapping from sets $\{x_a\}^C = \{x_b, x_c, x_d\}$ of different types of multiple images and combines output images of target domain $\hat{x}_a$ where 'C' may mean a complementary set. This mapping may be expressed as following Equation 1.

$$\hat{x}_\kappa = G(\{x_\kappa\}^C; \kappa)$$ [Equation 1]

Where $\kappa \in \{a, b, c, d\}$ may mean a target domain index that guides to generate an output for 'K' which is a suitable target domain.

Because the number of combinations for multiple inputs and a single output combination is N, the inventive concept randomly selects such combinations during training, thereby allowing the generator to learn various mappings for multiple target domains.

Network Loss

Figure 2:
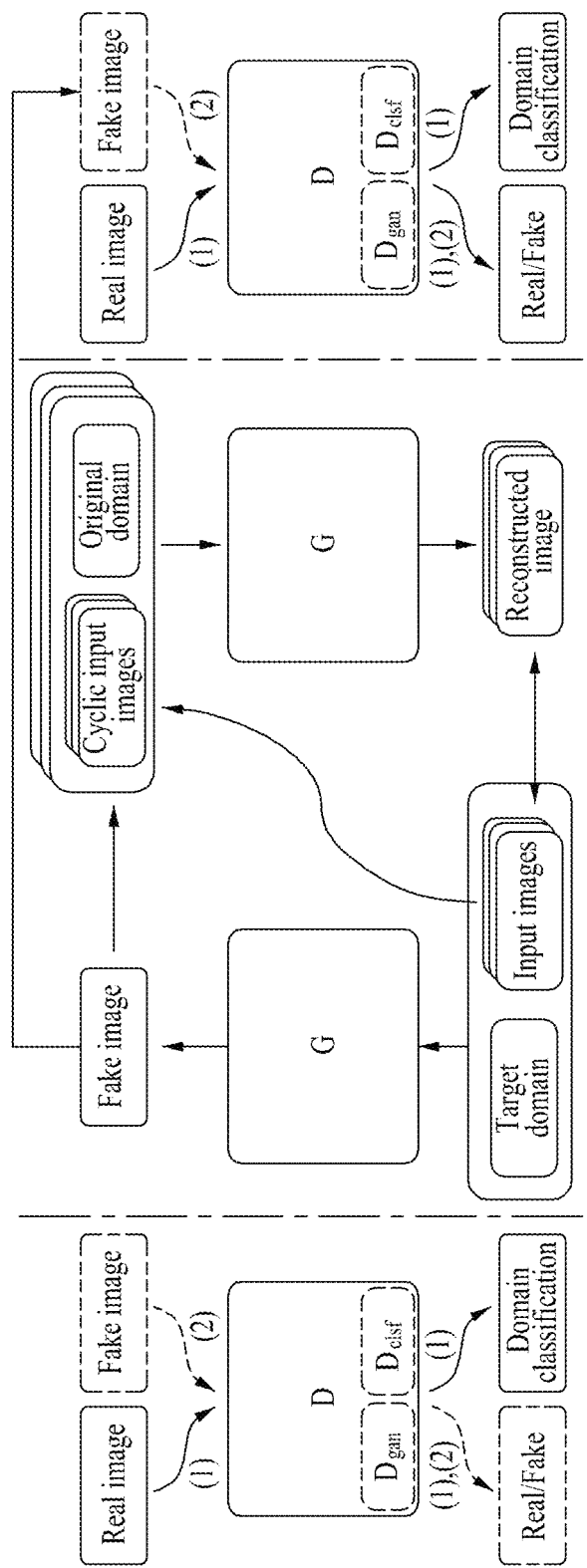
FIG. 2 is a view illustrating a process of training a neural network according to the inventive concept.

Multiple cycle consistency loss: One of the key concepts of a method according to an embodiment of the inventive concept is cycle consistency for multiple inputs. Because the input is multiple images, the cycle loss must be redefined. Assuming the output of forward generator G is $\hat{x}_a$, N−1 new combinations may be generated as another input to a backward flow of a generator, as shown in FIG. 2. For example, when N=4, there are three combinations of multiple inputs and a single output as expressed in following Equation 2, and three images of the original domain may be reconstructed by using a backward flow of a generator.

$$\tilde{x}_{b|a} = G(\{\hat{x}_a, x_c, x_d\}; b)$$

$$\tilde{x}_{c|a} = G(\{\hat{x}_a, x_b, x_d\}; c)$$

$$\tilde{x}_{d|a} = G(\{\hat{x}_a, x_b, x_c\}; d)$$ [Equation 2]

Where the associated multiple cycle consistency loss may be expressed as following Equation 3.

$$\mathcal{L}_{mcc,a} = \|x_b - \tilde{x}_{b|a}\|_1 + \|x_c - \tilde{x}_{c|a}\|_1 + \|x_d - \tilde{x}_{d|a}\|_1$$ [Equation 3]

Where $\|\cdot\|_1$ may means $l_1$-norm.

The multiple cycle consistency loss may mean a loss where the fake image data of the target domain generated from the input image data of the multiple domains are combined with the input image data and the image reconstructed from the combined multi-domain image data is similar to the original input image data.

In general, the cycle consistency loss of the forward generator $\hat{x}_\kappa$ may be expressed as following Equation 4 and Equation 5.

$$\mathcal{L}_{mcc,\kappa} = \sum_{\kappa' \neq \kappa} \|x_{\kappa'} - \tilde{x}_{\kappa'|\kappa}\|_1$$ [Equation 4]

$$\tilde{x}_{\kappa'|\kappa} = G(\{\hat{x}_\kappa\}^C; \kappa')$$ [Equation 5]

Discriminator loss: The discriminator performs two functions in which one is to classify the source whether the source is real or fake, and the other is to classify domain types of classes a, b, c and d. Thus, the discriminator loss may consist of two parts. As shown in FIG. 2, the discriminator loss may be implemented by using a discriminator with two paths of $D_{gan}$ and $D_{clsf}$, which share the same neural network weights except for the last layers.

Specifically, an adversarial loss is necessary to make the generated image as real as possible. A regular GAN loss may cause a gradient problem that disappears during a learning process. The inventive concept may utilize the adversarial loss of Least Square GAN (X. Mao, Q. Li, H. Xie, R. Y. Lau, Z. Wang, and S. P. Smolley. Least squares generative adversarial networks. In Computer Vision (ICCV), 2017 IEEE International Conference on, pages 2813-2821. IEEE, 2017.) instead of the original GAN loss to overcome such a problem and improve the robustness of the training. Specifically, the discriminator $D_{gan}$ may be optimized by minimizing the loss of following Equation 6, and the generator may be optimized by minimizing the loss of following Equation 7.

$$\mathcal{L}_{gan}^{dsc}(D_{gan}) = \mathbb{E}_{x_\kappa}[(D_{gan}(x_\kappa) - 1)^2] + \mathbb{E}_{\tilde{x}_{\kappa|\kappa}}[(D_{gan}(\tilde{x}_{\kappa|\kappa}))^2]$$ [Equation 6]

$$\mathcal{L}_{gan}^{gen}(G) = \mathbb{E}_{\tilde{x}_{\kappa|\kappa}}[(D_{gan}(\tilde{x}_{\kappa|\kappa}) - 1)^2]$$ [Equation 7]

Where $\tilde{x}_{\kappa|\kappa}$ may be defined through Equation 5.

Next, the domain classification loss may be composed of two parts $\mathcal{L}_{clsf}^{real}$ and $\mathcal{L}_{clsf}^{fake}$ which are cross-entropy losses for domain classification of real and fake images, respectively. The purpose of training the generator G is to generate an image properly classified into the target domain.

Therefore, the inventive concept first needs the best classifier $D_{clsf}$, which is trained only with real data, to properly guide the generator. Thus, the inventive concept minimizes loss $\mathcal{L}_{clsf}^{real}$ to train the classifier $D_{clsf}$, and then trains the generator G while fixing the classifier $D_{clsf}$, such that the generator is trained to produce correctly classified samples, thereby minimizing $\mathcal{L}_{clsf}^{fake}$.

In detail, in order to optimize $D_{clsf}$, $\mathcal{L}_{clsf}^{real}$ must be minimized for $D_{clsf}$ as expressed as following Equation 8.

$$\mathcal{L}_{clsf}^{real}(D_{clsf}) = \mathbb{E}_{x_\kappa}[-\log(D_{clsf}(\kappa;x_\kappa))] \quad \text{[Equation 8]}$$

Where $D_{clsf}(\kappa; x_\kappa)$ may mean the probability of accurately classifying the real input $x_\kappa$ as class 'K'.

To the contrary, the generator 'G' must be trained to generate a fake sample properly classified by $D_{clsf}$. Therefore, the loss expressed as following Equation 9 for the generator 'G' must be minimized.

$$\mathcal{L}_{clsf}^{fake}(G) = \mathbb{E}_{\hat{x}_{\kappa|k}}[-\log(D_{clsf}(\kappa;\hat{x}_{\kappa|k}))] \quad \text{[Equation 9]}$$

Structural similarity index (SSIM) loss: The SSIM is one of the most advanced indicators for measuring image quality. The $l_2$ loss, which is widely used in image reconstruction tasks, has been reported in the prior art to cause blurring artifacts in the results. The SSIM is one of perceptual metrics and can be differentiated to be back-propagated. The SSIM for pixel 'p' may be expressed as following Equation 10.

$$SSIM(p) = \frac{2\mu_X\mu_Y + C_1}{\mu_X^2 + \mu_Y^2 + C_1} \cdot \frac{2\sigma_{XY} + C_2}{\sigma_X^2 + \sigma_Y^2 + C_2} \quad \text{[Equation 10]}$$

Where $\mu X$ means mean X, $\sigma^2 x$ means variance of 'X', $\sigma xx^*$ means covariance of 'X' and 'X*', and $C_1$ and $C_2$ are variables for stabilizing division where $C_1=(k_1 L)^2$ and $C_2=(k_2 L)^2$, 'L' means a dynamic range of pixel intensity, and $k_1$ and $k_2$ may be 0.01 and 0.03.

Because the SSIM is defined between '0' and '1', the loss function for the SSIM may be expressed as following Equation 11.

$$\mathcal{L}_{SSIM}(X, Y) = -\log\left(\frac{1}{2|P|}\sum_{p\in P(X,Y)}(1 + SSIM(p))\right) \quad \text{[Equation 11]}$$

Where 'P' may mean a pixel position set, and |P| may mean cardinality of 'P'.

The SSIM loss may be applied as an additional multiple cycle consistency loss expressed as following Equation 12.

$$\mathcal{L}_{mcc-SSIM,\kappa} = \sum_{\kappa'\neq\kappa}\mathcal{L}_{SSIM}(x_{\kappa'}, \hat{x}_{\kappa'|\kappa}) \quad \text{[Equation 12]}$$

Mask Vector

To use a single generator, a target label must be added in the form of a mask vector to guide the generator. The mask vector, which is a binary matrix with the same dimensions as the input image, is easily connected to the input image. The mask vector has an N class channel dimension that can represent a target domain as a one-hot vector according to the channel dimension. This may be a simplified version of the mask vector introduced in the original StarGAN. That is, the mask vector may be target domain information for missing image data to be restored or replaced by using input image data of multiple domains input to the neural network.

Data Set

MR contrast synthesis: A total of 280 axial brain images may be scanned by multi-dynamic multi-echo sequences and additional T2 FLAIR sequences from 10 subjects. The data set may include four MR contrast image types such as T1-FLAIR (T1F), T2-weighted (T2w), T2-FLAIR (T2F), and T2-FLAIR* (T2F*). In this case, three MR contrast image types of T1-FLAIR (T1F), T2-weighted (T2w) and T2-FLAIR (T2F) may be obtained from MAGnetic venocation image compilation, and the MR contrast image type of T2-FLAIR* may be obtained through an additional scan with other MR scan parameters of a third contrast picture type (T2F). Details of the MR acquisition parameters may be identified in supplementary data.

CMU multi-PIE: A subset of multi-pose illumination and expression face database of Carnegie Mellon University may be used for illumination transformation tasks. The data set may be selected for five illumination conditions of −90 degrees (right), −45 degrees, 0 degrees (front), 45 degrees and 90 degrees (left) in the frontal direction of 250 participants' usual (neutral) facial expressions. The image may be cropped at a screen of a certain pixel size in which the face is located at the center.

Radboud faces database (RaFD): The RaFD may include eight different facial expressions collected from 67 participants, such as neutrality, anger, disdain, disgust, fear, happiness, sadness, and surprise. In addition, there are three different gaze directions, so a total of 1,608 images may be divided by subjects for training, validation and test set.

Network Implementation

The inventive concept includes two networks of generator 'G' and discriminator 13', as shown in FIG. 2. In order to obtain the best performance for each task, the inventive concept may redesign the generator and discriminator corresponding to the attribute of each task.

The generator is based on the U-net structure and includes an encoder part and a decoder part, and each part between the encoder and the decoder is connected by a contracting path. The generator may follow the net structure, and instead of a batch normalization layer that performs a normalization operation and a rectified linear unit layer (ReLU) that performs a nonlinear function operation, an instance normalization layer (D. Ulyanov, A. Vedaldi, and V. Lempitsky. Instance normalization: The missing ingredient for fast stylization. arXiv preprint arXiv: 1607.08022, 2016.) and Ricky-ReLU layer (K. He, X. Zhang, S. Ren, and J. Sun. Delving deep into rectifiers: Surpassing human-level performance on imagenet classification. In Proceedings of the IEEE international conference on computer vision, pages 1026-1034, 2015) may be used as the generator, respectively.

MR contrast transformation: There are various MR contrasts such as T1 weight contrast, T2 weight contrast, and the like. The specific MR contrast scan is determined by MRI scan parameters such as repetition time (TR), echo time (TE), and the like. The pixel intensity of the MR contrast image is determined by the physical properties of the tissue, called MR parameters of the tissue, such as T1, T2, proton density, and the like. The MR parameter has voxel-wise attribute. In case of a convolutional neural network, this means that pixel-by-pixel processing is just as important as processing information from a neighbor or large field of view (FOV). Thus, instead of using a single convolution, the generator may use two convolution branches with 1×1, 3×3 filters that can process multi-scale feature information. The two convolution branches are connected similarly to an inception network.

Illumination transformation: For the illumination transformation task, an original U-Net structure with an instance normalization layer may be used instead of a batch normalization layer.

Facial expression transformation: A plurality of facial images with various expressions are input for the facial expression transformation task. Because the subject's head movements exist between facial expressions, the image is not strictly aligned in the pixel direction. When the original U-net is used for the task between facial expression images, the performance of the generator is degraded because information about various facial expressions is mixed in the initial stage of the network. For reference, the features of facial expressions must be mixed in an intermediate stage of the generator which computes the features in a large FOV or already down-samples them into a pulling layer. Thus, the generator may be redesigned with eight encoder branches for every eight facial expressions and connected after the encoding process in the intermediate stage of the generator. The structure of the decoder is similar to the decoder part of the U-net except for adding more convolutional layers using residual blocks.

In general, the discriminator may include a series of convolution layers and Leaky-ReLU layers. As shown in FIG. 2, the discriminator has two output headers, where one may be a real or fake classification header and the other may be a classification header for a domain. The discriminator may use PatchGAN to determine whether a local image patch is real or fake. Dropout is very effective to prevent overfitting of a discriminator. Exceptionally, the discriminator of the MR contrast transformation has a branch for multi-scale-processing.

Of course, the neural network of the inventive concept is not limited to the neural network described above, and may include all kinds of networks to which the inventive concept may be applied. For example, the neural network according to the inventive concept may include various kinds of neural networks such as a generative antagonist network (GAN), a convolutional neural network, a convolutional framelet-based neural network, a multi-resolution neural network, for example, U-Net, including a pooling layer and an un-pooling layer. The multi-resolution neural network may include a bypass connection from the pooling layer to the un-pooling layer.

Network Training

All models may be optimized by using Adam with a learning rate of 0.00001, $\beta1=0.9$ and $\beta2=0.999$. As described above, the performance of the classifier must only be connected to the real label, which means that the classifier must only be trained by using the real data. Thus, according to the inventive concept, the classifier for a real image is first trained with a corresponding label for 10 epochs, and then, the generator and the discriminator are trained. The MR contrast conversion, illumination transformation and facial expression transformation tasks may take about 6 hours, 12 hours, and one day, respectively when an NVIDIA GTX 1080 GPU is used. The YCbCr color code may be used instead of the RGB color code in the illumination transformation task, and the YCbCr coding may include Y-luminance and CbCr-color. There are five different illumination images where three different illumination images share almost CbCr coding and the only difference exists in the Y-luminance channel. Thus, only the Y-luminance channel may be processed for the illumination transformation task, and the reconstructed image may be applied to the RGB coded image. According to the inventive concept, the RGB channel is used for the facial expression transformation task, and the MR contrast data set may be configured as a single channel image.

The method according to an embodiment of the inventive concept may train the discriminator network and the generator network by using the multiple cycle consistency loss. When a learning model of the generator network is generated through such a training process, the generator network, for example, the CollaGAN may be used to replace or reconstruct missing image data. That is, the method according to an embodiment of the inventive concept may receive the input image data of the multiple domains and information about the target domain from the neural network of the learning model generated through the training process using the multi-cycle consistency loss, for example, a mask vector, as an input, and reconstruct missing image data for the target domain by using the learning model of the neural network. Hereinafter, such a method according to the inventive concept will be described with reference to FIG. 3.

Figure 3:
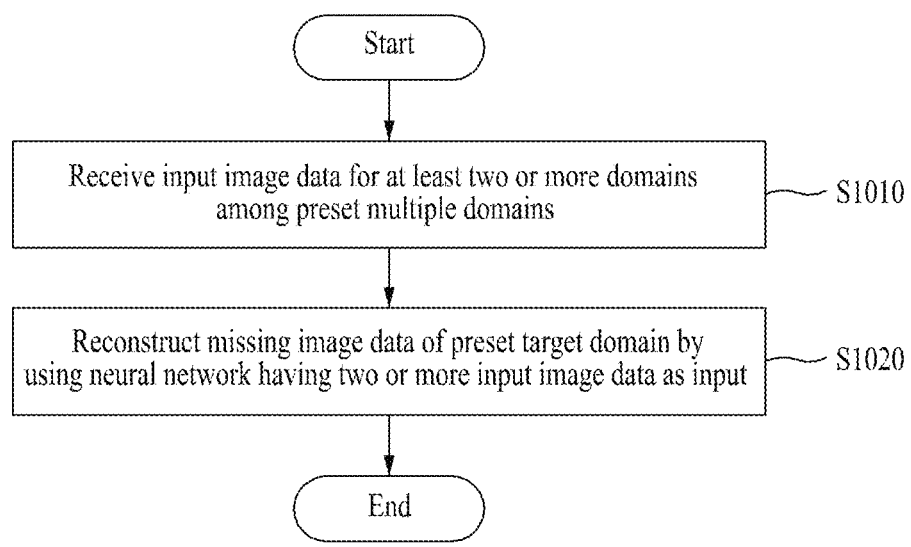
FIG. 3 is a flowchart illustrating a method of replacing missing image data according to an embodiment of the inventive concept.

FIG. 3 is a flowchart illustrating a method of replacing missing image data according to an embodiment of the inventive concept, and may include all of the above contents.

Referring to FIG. 3, in operation S310, the method of replacing missing image data according to an embodiment of the inventive concept receives input image data for at least two or more domains among preset multiple domains.

In this case, in operation S310, when the neural network for replacing missing image data of an MR contrast image is trained to reconstruct the missing image data for at least one of remaining two target domains by using the input image data of the two of the four domains, the neural network may receive the input image data for the two domains. When the neural network for replacing missing image data of the MR contrast image is trained to reconstruct missing image data of remaining one of four target domains by using the input image data of the three domains, the input image data for three domains may be received. Of course, in operation S310, the input image data for at least two domains may be received through the training process for the corresponding input image even when the missing image data for the illumination image or facial expression image is to be reconstructed. The input of the neural network previously learned through the training process may be determined by a business operator or individual providing the techniques of the inventive concept.

Furthermore, in operation S310, in addition to the input image data for two or more domains, information about a target domain to be reconstructed, for example, a mask vector may be received together.

When the input image data for at least two domains are received in operation S310, in operation S320, the missing image data of a preset target domain are reconstructed by using a neural network to which the received input image data for two or more domains are input.

In this case, the neural network of operation S320 may receive information about the target domain as an input, and reconstruct the missing image data for the received target domain based on the input image data for two or more domains input and the learning model of the neural network. As described above, the neural network may be trained using multiple cycle consistency loss, so that the learning model is generated.

The neural network in operation S320 may be the generator network trained in FIG. 2. As described above, the neural network may include various kinds of neural networks such as a multi-resolution neural network, for example, U-Net, including a generative antagonist network (GAN), a convolutional neural network, a convolutional framelet-based neural network, where the multi-resolution neural network includes a bypass connection from the pooling layer to the un-pooling layer. In addition, the neural network may include all kinds of neural networks usable in the inventive concept.

For example, the inventive concept defines four domains of 'A', 'B', 'C' and 'D' as an entire image data set, and when data called 'D' are missed, data of the domains A, B and C are used to reconstruct the image 'D' using the data of the domains A, B and C as the input of the generator network. In the case of the reconstructed image 'D' (fake image), the discriminator network learns the generator network for the purpose of determining the reconstructed image as a real image, and is trained to distinguish the fake image and the real image. In addition, the generator network performs training to trick the discriminator network. Finally, the trained generator network is trained to provide a very realistic and actual image, so that the missing image data of the desired target domain may be restored by using the multi-domain input image data as an input.

As described above, the method according to an embodiment of the inventive concept may define the entire image data set for all domains, and use the image data of existing multiple domains as an input of the neural network to replace or restore the image data of a desired target domain.

The method according to an embodiment of the inventive concept uses a neural network to solve the problem of missing data, so that it is possible to receive multiple inputs of an image for the purpose of many-to-one image transformation, and the multi-cycle consistency loss is used for stable training in this process.

Figure 4:
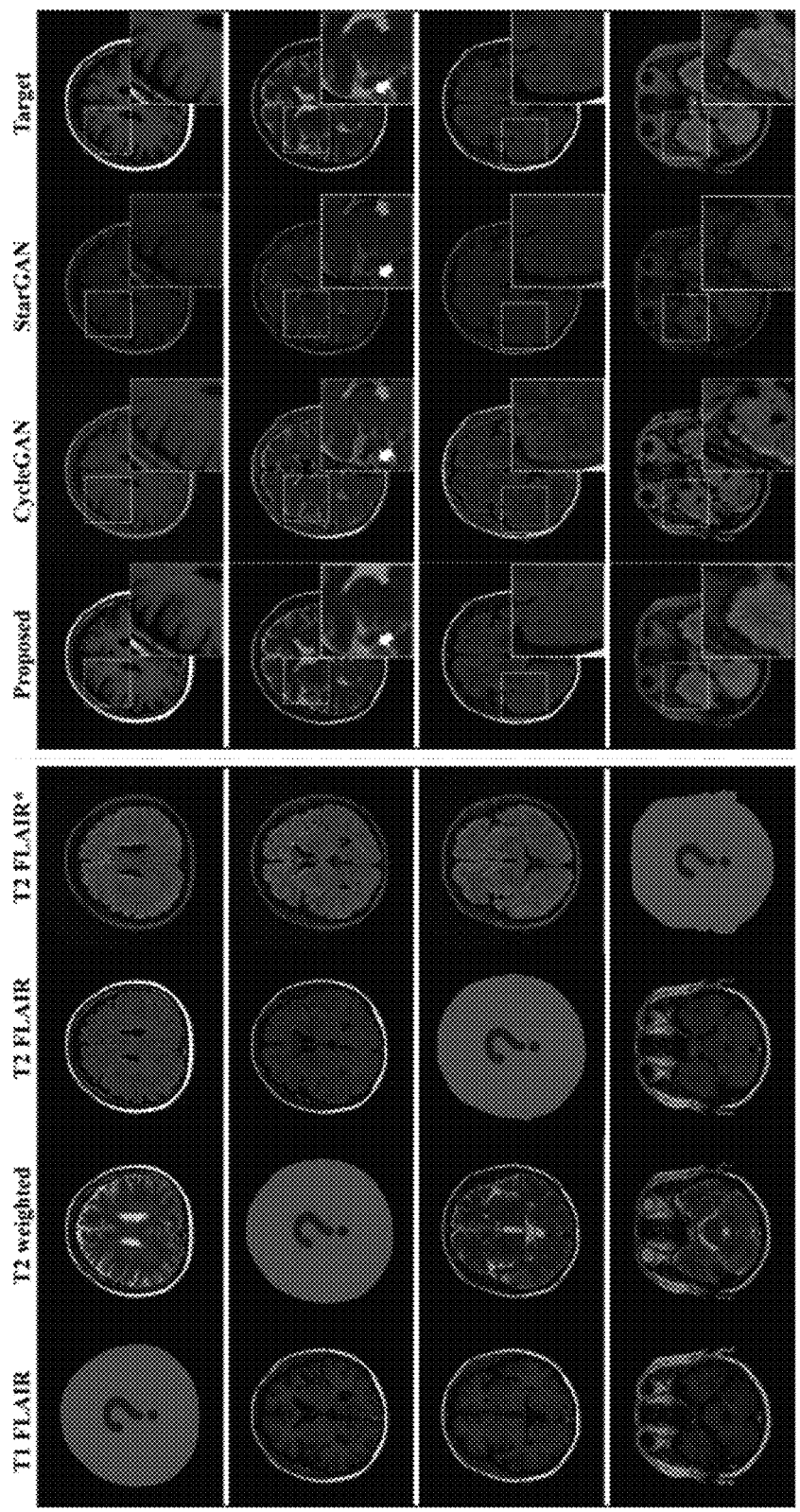
FIG. 4 is a view illustrating an example of an MR contrast.

When the missing image data is reconstructed using the method according to the embodiment of the inventive concept, it is possible to recover with much better performance than other algorithms for reconstructing using a single input image. For example, as shown in FIG. 4, it may be confirmed that the performance of CycleGAN and StarGAN using only one input in MR contrast image data set is deteriorated, and it may be conformed that the method proposed according to an embodiment of the inventive concept has excellent performance.

Figure 5:
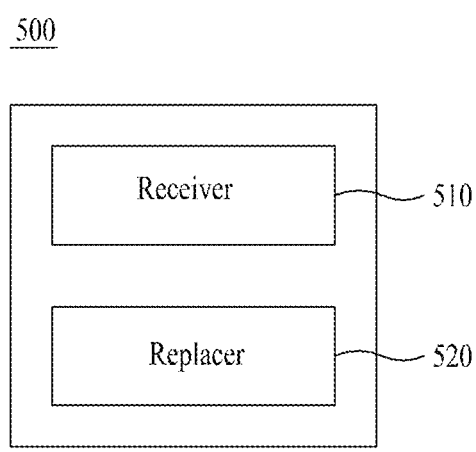
FIG. 5 illustrates a configuration of an apparatus for replacing missing image data according to an embodiment of the inventive concept.

FIG. 5 is a view illustrating a configuration of an apparatus for replacing missing image data according to an embodiment of the inventive concept, and illustrates a conceptual configuration of an apparatus for performing the method of FIGS. 1 to 4.

Referring to FIG. 5, an apparatus 500 according to an embodiment of the inventive concept includes a receiver 510 and a replacer 520.

The receiver 510 receives input image data for at least two or more domains among preset multiple domains.

In this case, when the neural network for replacing missing image data of an MR contrast image is trained to reconstruct the missing image data for at least one of remaining two target domains by using the input image data of the two of the four domains, the receiver 510 may receive the input image data for the two domains. When the neural network for replacing missing image data of the MR contrast image is trained to reconstruct missing image data of remaining one of four target domains by using the input image data of the three domains, the receiver 510 may receive the input image data for the three domains.

Furthermore, the receiver 510 may receive information about a target domain to be reconstructed, for example, a mask vector together as well as the input image data for two or more domains.

When the input image data for at least two domains are received, the replacer 520 restores the missing image data of a preset target domain by using a neural network to which the received input image data for two or more domains are input.

In this case, the replacer 520 may receive information about the target domain as an input, and reconstruct the missing image data for the received target domain based on the input image data for two or more domains input and the learning model of the neural network.

In this case, as described above, the neural network may be trained using multiple cycle consistency loss, so that the learning model is generated. In this case, as described above, the neural network may include a multi-resolution neural network including a generative antagonist network (GAN), a convolutional neural network, a convolutional framelet-based neural network, a pooling layer, and an un-pooling layer, where the multi-resolution neural network includes a bypass connection from the pooling layer to the un-pooling layer.

Although the description is omitted in the apparatus of FIG. 5, the apparatus of FIG. 5 may include all of the contents described with reference to FIGS. 1 to 4, and these matters will be appreciated by those skilled in the art.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may execute an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, it is intended that the inventive concept covers other realizations and other embodiments provided they come within the scope of the appended claims and their equivalents.

According to the embodiments of the inventive concept, by restoring missing image data of a target domain using a neural network using image data of each of multiple domains as an input, reconstruction performance may be improved.

According to the embodiments of the inventive concept, because it is possible to use a data acquisition method that is currently used in the diagnosis of cancer in the medical field without modification, and in this case, replace a possible missing data problem that may occur without additional cost and photographing, time and financial costs may be dramatically saved for both patients and hospitals.

According to the embodiments of the inventive concept, when a missing occurs in the image set of the various contrasts required for cancer diagnosis, the inventive concept may be used to replace the missing, to replace the missing data in the various illumination direction data set, and to replace missing data in human face data of various expressions. In addition, the inventive concept may be universally used for the missing data, which are generated when various domains exist, missing data in various camera angle data, missing data in the data corresponding to the resolution of an image, missing data in the data corresponding to the noise level of an image, missing data in the data corresponding to the artistic style or type of an image, and missing image data, missing data in font type data of a character, or the like.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method of replacing missing image data, the method comprising: classifying images as belonging to one of a plurality of preset domains by a discriminator having a domain classification path trained using real images belonging to the plurality of preset domains; generating fake image data to replace image data missing from a target image of an object belonging to a target domain, by a generator, using images of the object belonging to one or more of the other preset domains; reconstructing an image of the object, by the generator, using the target image and the generated fake image data; wherein the discriminator further comprises a source classification path trained using the real images and the fake image data to classify a source of the image data as either real or fake, and the generator is trained using multiple cycle consistency loss to generate reconstructed images classified by the discriminator as belonging to the target domain.

2. The method of claim 1, wherein the images belonging to the plurality of preset domains include a mask vector indicative of the domain.

3. The method of claim 1, wherein the discriminator and the generator comprise at least one of a generative adversarial network (GAN), a convolutional neural network, a convolution framelet based neural network, and a multi-resolution neural network having a pooling layer and an unpooling layer.

4. The method of claim 3, wherein the multi-resolution neural network comprises a bypass connection from the pooling layer to the unpooling layer.

5. An apparatus for replacing missing image data, the apparatus comprising: a discriminator having a domain classification path, trained using real images belonging to a plurality of preset domains, to classify images as belonging to one of the plurality of preset domains; a generator trained to: generate fake image data to replace image data missing from a target image of an object belonging to a target domain using images of the object belonging to one or more of the other preset domains and reconstruct an image of the object using the target image and the generated fake image data; the discriminator having a source classification path trained using the real images and the fake image data to classify a source of the image data as either real or fake, wherein the generator is trained using multiple cycle consistency loss to generate reconstructed images classified by the discriminator as belonging to the target domain.

6. The apparatus of claim 5, wherein the discriminator receives images belonging to the plurality of preset domains that include a mask vector indicating the domain of each image.

7. The apparatus of claim 5, wherein the discriminator and the generator comprise at least one of a generative adversarial network (GAN), a convolutional neural network, a convolution framelet based neural network, and a multi-resolution neural network having a pooling layer and an unpooling layer.

8. The apparatus of claim 7, wherein the multi-resolution neural network comprises a bypass connection from the pooling layer to the unpooling layer.

9. The method of claim 1, wherein the images of the object comprise image data selected from the group consisting of MR contrast synthesis data, multi-pose illumination data, facial expression data, and combinations thereof.

10. The apparatus of claim 5, wherein the images of the object comprise image data selected from the group consisting of MR contrast synthesis data, multi-pose illumination data, facial expression data, and combinations thereof.

* * * * *